United States Patent
Tu et al.

(10) Patent No.: US 12,182,473 B2
(45) Date of Patent: Dec. 31, 2024

(54) CONTROL METHOD OF MICROPHONE AND ELECTRONIC APPARATUS

(71) Applicant: Acer Incorporated, New Taipei (TW)

(72) Inventors: Po-Jen Tu, New Taipei (TW); Ruey-Ching Shyu, New Taipei (TW); Jia-Ren Chang, New Taipei (TW); Kai-Meng Tzeng, New Taipei (TW)

(73) Assignee: Acer Incorporated, New Taipei (TW)

( * ) Notice: Subject to any disclaimer, the term of this patent is extended or adjusted under 35 U.S.C. 154(b) by 223 days.

(21) Appl. No.: 17/960,836

(22) Filed: Oct. 6, 2022

(65) Prior Publication Data
US 2023/0418549 A1    Dec. 28, 2023

(30) Foreign Application Priority Data
Jun. 27, 2022   (TW) .................................. 111123864

(51) Int. Cl.
*H02B 1/00*       (2006.01)
*G06F 3/16*       (2006.01)
*G06F 11/34*      (2006.01)
*H04R 3/00*       (2006.01)

(52) U.S. Cl.
CPC .......... *G06F 3/165* (2013.01); *G06F 11/3438* (2013.01)

(58) Field of Classification Search
CPC ............... G06F 3/165; G06F 11/3438
USPC .................................................. 381/123, 122
See application file for complete search history.

(56) References Cited

U.S. PATENT DOCUMENTS 11,816,056 B1 *  11/2023  Welch ..................... G06F 13/16
2014/0380406 A1   12/2014  Saidi et al.

FOREIGN PATENT DOCUMENTS

| CN | 113728380  | 11/2021 |
| TW | 202110197  | 3/2021  |
| WO | 2015102714 | 7/2015  |

* cited by examiner

*Primary Examiner* — Ammar T Hamid
(74) *Attorney, Agent, or Firm* — JCIPRNET

(57) ABSTRACT

A control method of microphone and an electronic apparatus are provided. In the control method, a switching operation is received. In response to receiving the switching operation, a sound-receiving state of a target program is detected. The sound-receiving state of the microphone is switched through an audio effect processing corresponding to the target program according to the detection result of the sound-receiving state, to switch the sound-receiving state of the target program from one of an activated state and a disabled state to the other. The switching operation is used for switching the sound-receiving state of the microphone. The sound-receiving state represents whether to receive sound through the microphone. The sound-receiving state includes the activated state and the disabled state. The target program is a currently running application. The audio effect processing is implemented by an audio engine between an application layer and a driver layer.

16 Claims, 5 Drawing Sheets

Switching the indicator light from one of a first state and a second state to the other through the embedded controller in response to receiving the switching operation — S410
FIG. 4
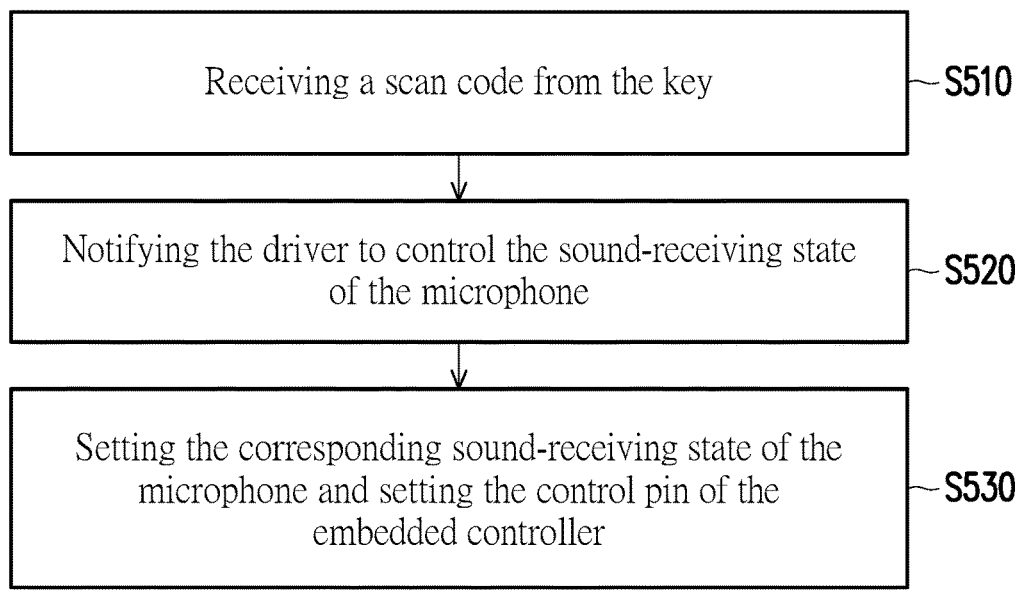
FIG. 5
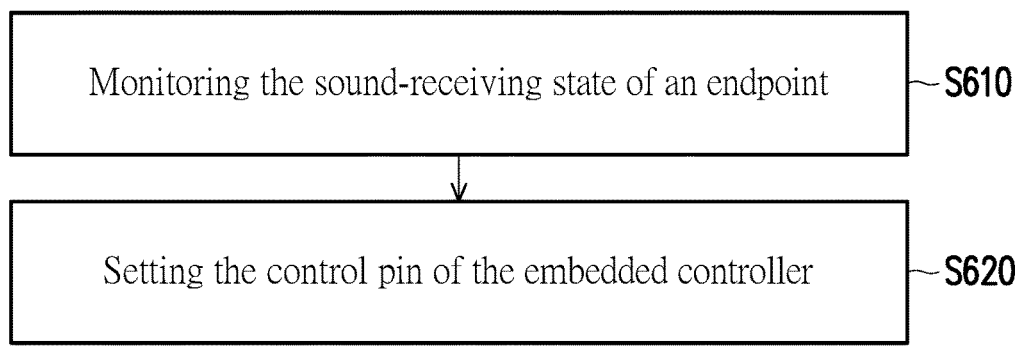
FIG. 6

CONTROL METHOD OF MICROPHONE AND ELECTRONIC APPARATUS

CROSS-REFERENCE TO RELATED APPLICATION

This application claims the priority benefit of Taiwan application serial no. 111123864, filed on Jun. 27, 2022. The entirety of the above-mentioned patent application is hereby incorporated by reference herein and made a part of this specification.

BACKGROUND

Technical Field

The disclosure relates to a control technology of a microphone, and more particularly, to a control method of a microphone and an electronic apparatus.

Description of Related Art

A calling program usually has a microphone mute key which allows the user to stop the sound-receiving state according to the needs. However, pressing the microphone mute key will cause all applications to activate or disable the sound-receiving state at the same time. In the case of multiple applications running, the user cannot stop the sound-receiving state of only a single application.

SUMMARY

In view of the above, embodiments of the disclosure provide a control method of a microphone and an electronic apparatus, which may individually control the sound-receiving state of an application.

A control method of a microphone according to an embodiment of the disclosure includes the following (but is not limited to including): receiving a switching operation; in response to receiving the switching operation, detecting the sound-receiving state of a target program; and switching the sound-receiving state of the microphone through an audio effect processing corresponding to the target program according to a detection result of the sound-receiving state, to switch the sound-receiving state of the target program from one of the activated state and the disabled state to the other. The switching operation is configured to switch the sound-receiving state of the microphone, and the sound-receiving state represents whether to receive sound through the microphone, and the sound-receiving state includes the activated state and the disabled state. The target program is a currently running application. The audio effect processing is implemented by an audio engine between an application layer and a driver layer.

An electronic apparatus according to an embodiment of the disclosure includes (but is not limited to including) a microphone, a memory and a processor. The microphone is configured to receive sound. The memory is configured to store a code. The processor is coupled to the microphone and the memory. The processor is configured to load the code to execute: receiving a switching operation; in response to receiving the switching operation, detecting the sound-receiving state of a target program; and switching the sound-receiving state of the microphone through an audio effect processing corresponding to the target program according to a detection result of the sound-receiving state, to switch the sound-receiving state of the target program from one of the activated state and the disabled state to the other. The switching operation is configured to switch a sound-receiving state of a microphone, and the sound-receiving state represents whether to receive sound through the microphone, and the sound-receiving state includes an activated state and a disabled state. The target program is a currently running application. The audio effect processing is implemented by an audio engine between an application layer and a driver layer.

An electronic apparatus according to an embodiment of the disclosure includes (but is not limited to including) a microphone, a key, an indicator light, an embedded controller, a memory and a processor. The microphone is configured to receive sound. The key is configured to receive a switching operation. The switching operation is configured to switch a sound-receiving state of a microphone, and the sound-receiving state represents whether to receive sound through the microphone, and the sound-receiving state includes an activated state and a disabled state. The indicator light is configured to indicate the sound-receiving state, provide a first state for indicating the activated state, and provide a second state for indicating the disabled state. The embedded controller is coupled to the indicator light and configured to control the indicator light. The memory is configured to store a code. The processor is coupled to the microphone, the key, the embedded controller and the memory. The processor is configured to load the code to execute: switching the indicator light from one of the first state and the second state to the other through the embedded controller in response to receiving the switching operation.

Based on the above, according to the control method of the microphone and the electronic apparatus according to the embodiments of the disclosure, the currently used target program is detected, and the sound-receiving state of the target program may be independently controlled accordingly. Further, in response to receiving the switching operation, the state of the indicator light is switched. In this way, it is convenient for the user to operate multiple applications, and the user experience is enhanced.

In order to make the above-mentioned features and advantages of the disclosure more obvious and comprehensible, the following embodiments are described in detail with reference to the accompanying drawings.

BRIEF DESCRIPTION OF THE DRAWINGS

FIG. 4 is a flowchart of a control method of the indicator light according to an embodiment of the disclosure.

FIG. 5 is a flowchart of a physical key controlling the indicator light according to an embodiment of the disclosure.

FIG. 6 is a flowchart of a virtual key controlling the indicator light according to an embodiment of the disclosure.

DESCRIPTION OF EMBODIMENTS

Figure 1:
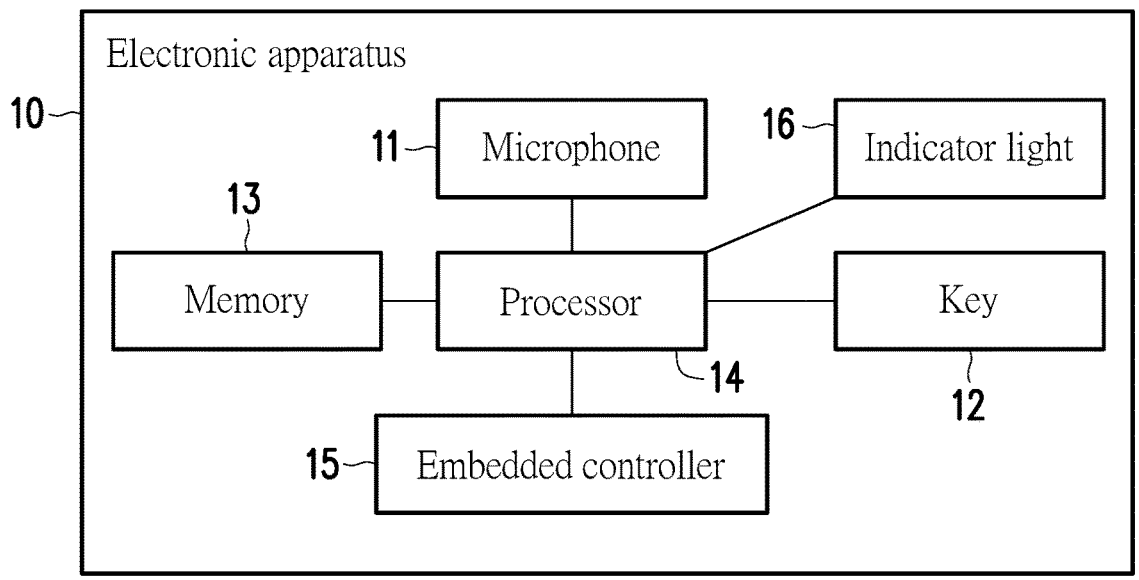
FIG. 1 is a block diagram of components of an electronic apparatus according to an embodiment of the disclosure.

FIG. 1 is a block diagram of components of an electronic apparatus 10 according to an embodiment of the disclosure. With reference to FIG. 1, the electronic apparatus 10 includes (but is not limited to including) a microphone 11, a key 12, a memory 13 and a processor 14. The electronic apparatus 10 may be a desktop computer, a notebook computer, a smart phone, a tablet computer, a wearable device, or other electronic apparatuses.

The microphone 11 may be a dynamic type, condenser type, or electret condenser type microphone. The microphone 11 may also be a combination of other electronic components, analog-to-digital converters, filters, and audio processors that may receive sound waves (for example, human voice, ambient sound, machine operation sound, and the like) and convert them into sound signals. In an embodiment, the microphone 11 is configured to receive/record the voice of the speaker to obtain the input sound signal.

The key 12 may be a key on a physical or virtual keyboard, such as the F4 key or F8 key of a physical keyboard. For another example, it may be a microphone key of a virtual keyboard displayed on a display (not shown). Alternatively, the key 12 may be a microphone mute key on an application (for example, a calling program, a recording program, a voice assistant program, or a conferencing program).

The memory 13 may be any type of fixed or removable random access memory (RAM), read only memory (ROM), flash memory, hard disk drive (HDD), solid-state drive (SSD) or similar components. In an embodiment, the memory 13 is configured to store code, software modules, configuration, data or files (for example, state or time).

The processor 14 is coupled to the microphone 11, the key 12 and the memory 13. The processor 14 may be a central processing unit (CPU), a graphics processing unit (GPU), or a programmable general-purpose or special-purpose microprocessor, a digital signal processor (DSP), a programmable controller, a field programmable gate array (FPGA), an application-specific integrated circuit (ASIC), a neural network accelerator or other similar elements or combinations of the above elements. In an embodiment, the processor 14 is configured to execute all or part of the operations of the electronic apparatus 10, and may load and execute various code, software modules, files and data stored in the memory 13. In some embodiments, some operations in the methods of the embodiments of the disclosure may be implemented by different or the same processor 14.

In an embodiment, the electronic apparatus 10 further includes an embedded controller 15. The embedded controller 15 is coupled to the processor 14. In an embodiment, the embedded controller 15 provides one or more pins. The embedded controller 15 may receive a state control signal from the processor 14 (which, for example, indicates the sound-receiving state of the microphone 11), and control the level of the pin (for example, a high or low pin) according to the state control signal. Alternatively, the embedded controller 15 may receive a power state signal from the processor 14 (which, for example, indicates a working state or any power saving state), and control the level of the pin according to the power state signal.

In an embodiment, the electronic apparatus 10 further includes an indicator light 16. The indicator light 16 may be a light-emitting diode (LED) or other types of light sources. The indicator light 16 is coupled to the embedded controller 15. In an embodiment, the indicator light includes multiple states, such as light on and light off, two lumens, or two colors. In an embodiment, the embedded controller 15 is configured to control the state of the indicator light 16. For example, the indicator light 16 is turned on by the high level of the pin, or the indicator light 16 is turned off by the low level.

Hereinafter, methods according to embodiments of the disclosure will be described with reference to various apparatuses, components and modules in the electronic apparatus 10. Each process of the method may be adjusted according to the implementation situation, and it is not limited thereto.

Figure 2:
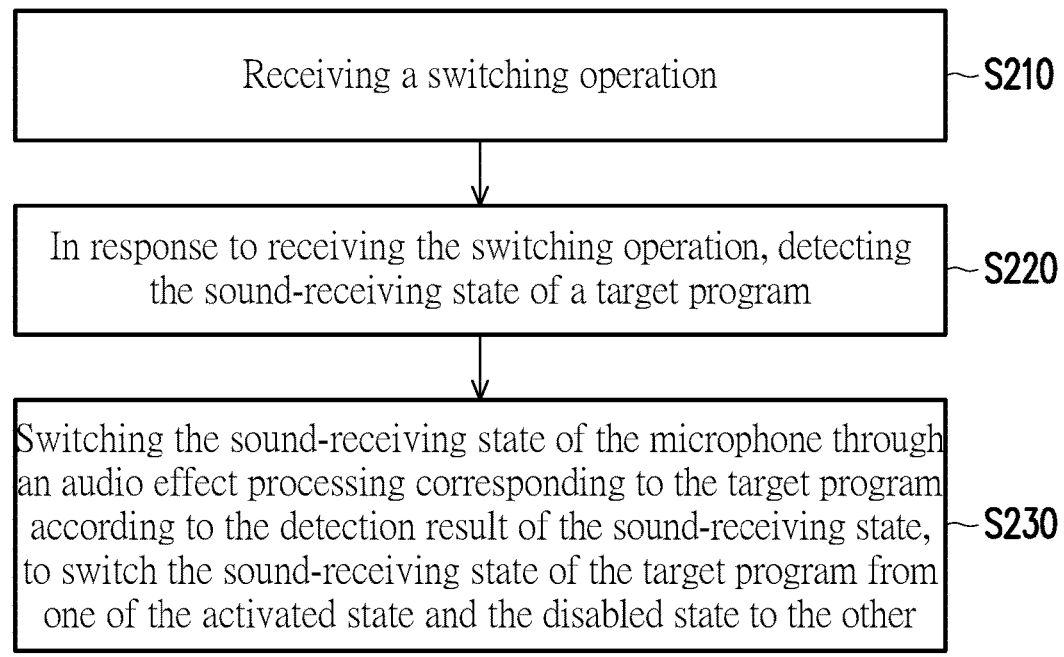
FIG. 2 is a flowchart of a control method of the microphone according to an embodiment of the disclosure.

FIG. 2 is a flowchart of a control method of the microphone 11 according to an embodiment of the disclosure. With reference to FIG. 2, the processor 14 receives a switching operation through the key 12 (step S210). Specifically, the switching operation is for switching the sound-receiving state of the microphone 11. The sound-receiving state represents whether to receive sound through the microphone 11, and the sound-receiving state includes an activated state and a disabled state. That is, in the activated state, the microphone 11 may receive/record sound; in the disabled state, the microphone 11 is prohibited from/is stopped from/ refrains from receiving/recording sound. The switching operation on the key 12 is, for example, a pressing, clicking, or sliding operation, but it is not limited thereto. In some embodiments, the switching operation may be configured with a specific operation time or number of times, such as pressing twice, or pressing for two seconds.

In response to receiving the switching operation, the processor 14 detects the sound-receiving state of a target program (step S220). Specifically, the target program is a currently running application, such as an application running in the foreground or an application currently being operated/ used by the user. The determination of the current operation/ use is based on the operation object of the possible input device (for example, a mouse, a keyboard or a touch panel), the frontmost window, or an application selected by the user, but it is not limited thereto.

Figure 3:
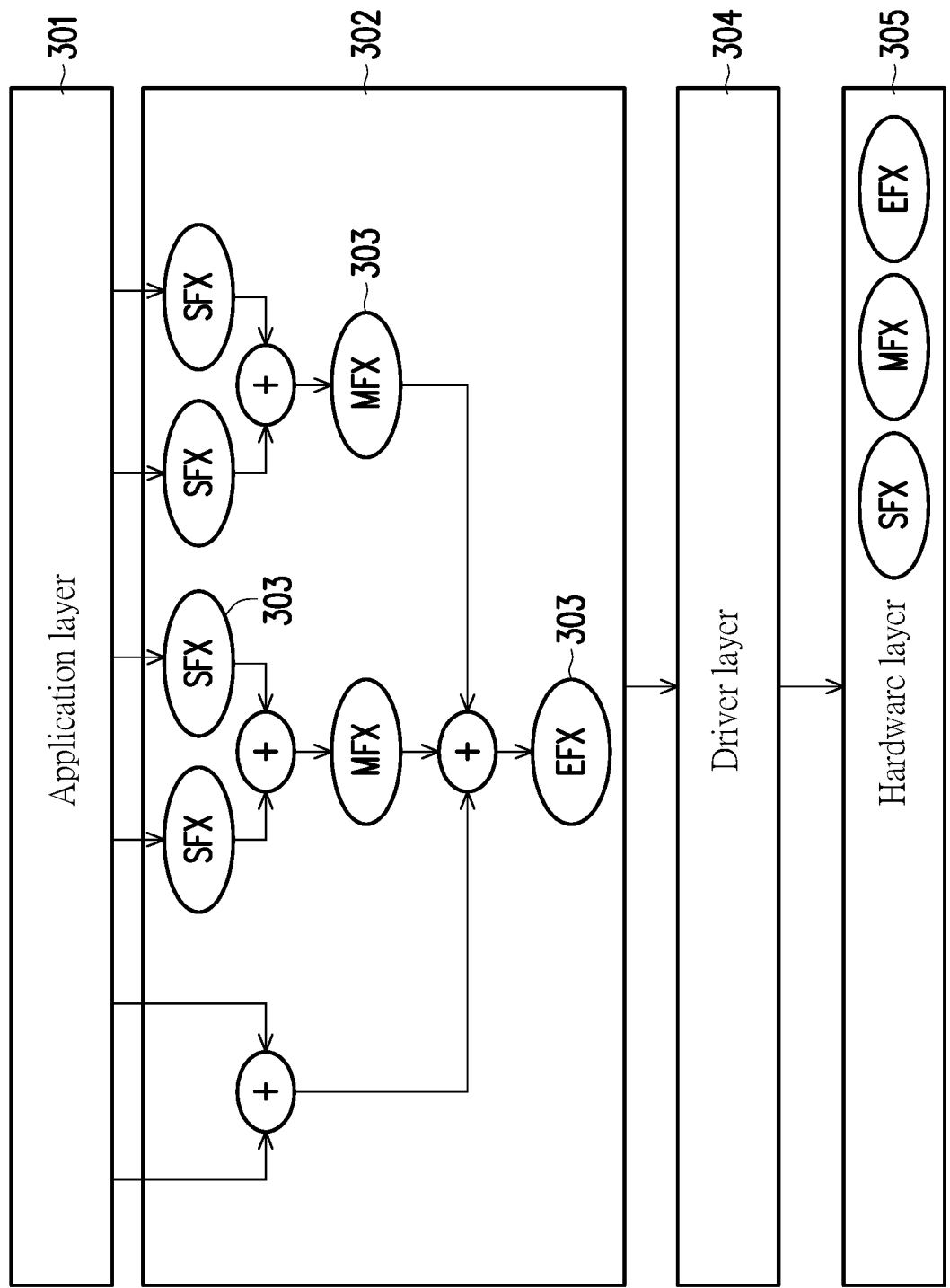
FIG. 3 is a structural diagram of audio effect processing according to an embodiment of the disclosure.

In an embodiment, the processor 14 may determine the detection result of the sound-receiving state according to the sound-receiving state set for the microphone 11 according to the corresponding audio effect processing of the target program in the audio engine. The audio effect processing may be implemented by an audio engine located between the application layer and the driver layer. FIG. 3 is a structural diagram of audio effect processing according to an embodiment of the disclosure. With reference to FIG. 3, the audio engine 302 is between the application layer 301 and the driver layer 304. The sound-receiving path of the microphone 11 is the hardware layer 305, the driver layer 304, the audio engine 302 and the application layer 301 in sequence. The audio engine 302 may provide a software-based digital signal processing effect (which may be referred to as the audio effect 303, or a sound effect, that is, the above-mentioned audio effect processing) for the audio stream, and is implemented by an audio processing object (APO), such as equalization processing, echo cancellation, or gain control. In the architecture of APO, three audio effects 303 may be provided to realize audio processing components, which includes stream effects (SFX), mode effects (MFX) and endpoint effects (EFX). However, the APO may also have other customized audio effects, and embodiments of the disclosure do not limit the content of the audio effect processing. Notably, each audio effect 303 in the audio engine 302 may correspond to one application (that is, one-to-one) or multiple applications (that is, one-to-many) in the application layer. For example, the calling programs share one audio effect 303. In addition, the processor 14 may control the sound-receiving state of the corresponding application by issuing a command or setting configuration for one or multiple audio effect processing, to change the sound-receiving state of the application using the microphone 11. The processor 14 may confirm whether the buffer is empty (null or 0) in the audio effect 303 to confirm the sound-receiving state of the corresponding application. For example, that the buffer is empty or no data indicates the disabled state, and that the buffer has data indicates the activated state.

In an embodiment, the processor 14 may directly query the application or issue a command to the application to obtain the sound-receiving state corresponding to the application.

Please refer to FIG. 2. The processor 14 switches the sound-receiving state of the microphone 11 through an audio effect processing corresponding to the target program according to the detection result of the sound-receiving state, to switch the sound-receiving state of the target program from one of the activated state and the disabled state to the other (step S230). Specifically, as described above, the processor 14 may also control the sound-receiving state of the target program by issuing a command or setting configuration to the audio effect processing corresponding to the target program. If the detection result is the activated state, the processor 14 switches the sound-receiving state of the target program to the disabled state through the audio effect processing; if the detection result is the disabled state, the processor 14 switches the sound-receiving state of the target program to the activated state through the audio effect processing.

It may be seen that embodiments of the disclosure may realize the adjustment of the sound-receiving state of a single application. In an embodiment, for one or more applications that are currently running but are different from the target program (hereinafter collectively referred to as the non-target program), the processor 14 may keep unchanged the sound-receiving state of the microphone used for the audio effect processing corresponding to the non-target program. For example, the processor 14 may maintain the sound-receiving state of the non-target program by stopping/disabling/not issuing a command or setting configuration for the audio effect processing corresponding to the non-target program.

In an embodiment, the target program and the non-target program share the audio effect processing. For example, two programs share SFX. In the audio engine, the processor 14 may provide a virtual audio cable (VAC) in series between the target program and the audio effect processing. The VAC may transmit audio streams between applications, and may mix or split different audio streams. That is, the VAC may separately control the paths of the audio streams of the target program and the non-target program. If only the sound-receiving state of the target program needs to be switched, the processor 14 may switch only the sound-receiving state of the target program through the VAC. For example, for the disabled state, the VAC may stop the audio stream input from the microphone 11 to the target program, but the audio stream input to the non-target program may still pass.

In another embodiment, for the non-target program, the processor 14 may set the sound-receiving state of the microphone 11 used for the audio effect processing corresponding to the non-target program to be the same as the sound-receiving state to which the target program is switched. The processor 14 may detect the sound-receiving state of the audio effect processing corresponding to each non-target program. If the detection result of the non-target program is different from the sound-receiving state to which the target program is switched, the processor 14 may switch the sound-receiving state of the non-target program by issuing a command or setting configuration to the audio effect processing corresponding to the non-target program. If the detection result of the non-target program is the same as the sound-receiving state to which the target program is switched, the processor 14 may maintain the sound-receiving state of the non-target program or still issue a command or set configuration for the audio effect processing corresponding to the non-target program.

In an embodiment, the processor 14 may detect the operation time of the switching operation. This operation time is the pressing time of the key 12. The processor 14 may switch or maintain the sound-receiving state of the non-target program according to the operation time. For example, if the operation time is less than three seconds, the processor 14 switches only the sound-receiving state of the target program, but maintains the sound-receiving state of the non-target program. If the operation time is longer than three seconds, the processor 14 sets the sound-receiving state of the non-target program to be the same as the sound-receiving state to which the target program is switched. In another embodiment, the control of the sound-receiving state of the non-target program may also be based on the operation frequency, number of times or gestures of the switching operation, such as a double press in a second, or a swipe gesture.

In this way, the sound-receiving state of a specific program or all programs may be switched as desired according to requirements. For example, the calling program stops receiving the sound, but the recording program may continue receiving the sound.

In addition to switching the sound-receiving state of the application, embodiments of the disclosure also provide the control of the indicator light 16.

FIG. 4 is a flowchart of a control method of the indicator light 16 according to an embodiment of the disclosure. With reference to FIG. 4, the processor 14 switches the indicator light 16 from one of a first state and a second state to the other through the embedded controller 15 in response to receiving the switching operation (step S410). Specifically, the indicator light 16 is configured to indicate the sound-receiving state of the microphone 11. The indicator light 16 may provide a first state to indicate the activated state and a second state to indicate the disabled state. For example, the first state is light on, and the second state is light off.

FIG. 5 is a flowchart of a physical key controlling the indicator light 16 according to an embodiment of the disclosure. With reference to FIG. 5, it is assumed that the key 12 is a physical key. The processor 14 receives the switching operation for the sound-receiving state through the key 12, and receives a scan code from the key 12 through an audio service (step S510). For example, the key 12 generates a scan code through a universal serial bus (USB)/human interface devices (HID) interface; the scan code of the key F4 is, for example, 3c, and the scan code of the key F8 is, for example, 41. The audio service may learn the reception of the switching operation based on the scan code, and thus learn the trigger of switching the sound-receiving state. The audio service may monitor a connected sound input device (for example, the microphone 11 of a Bluetooth headset or a USB microphone), and notify the driver to control the sound-receiving state of the microphone 11 (step S520), to set the corresponding sound-receiving state of the microphone 11 and set the control pin of the embedded controller 15 through the audio driver according to the scan code (step S530). For example, if the sound-receiving state of all sound input devices is the activated state, the audio driver sets the sound-receiving state of all sound input devices to the disabled state; otherwise, it sets the sound-receiving state to the activated state. For another example, if the control pin (for example, general-purpose input/output) of the embedded controller 15 is at a high level, the indicator light 16 is in the first state; if the control pin of the embedded controller 15 is at a low level, the indicator light 16 is in the second state, but it is not limited thereto.

In an embodiment, in response to receiving the switching operation, after switching the sound-receiving state of the application, the processor 14 may also detect the sound-receiving state of the currently used target program or other programs, and switch the indicator light 16 from one of the first state and the second state to the other through the embedded controller 15 according to the detection result of the sound-receiving state and the reception of the switching operation. For example, the processor 14 determines that the indicator light 16 is in the first state or the second state according to the detection result of the sound-receiving state of the audio effect processing corresponding to the application. If the detection result is the disabled state, the indicator light 16 exhibits the second state; if the detection result is the activated state, the indicator light 16 exhibits the first state.

FIG. 6 is a flowchart of a virtual key controlling the indicator light according to an embodiment of the disclosure. With reference to FIG. 6, it is assumed that the key 12 is a virtual key in an application or on a virtual keyboard. The processor 14 receives the switching operation for the sound-receiving state through the key 12, and monitors the sound-receiving state of an endpoint (that is, the application) through the audio service (step S610). The processor 14 sets the control pin of the embedded controller 15 according to the monitoring result of the sound-receiving state through the audio driver (step S620). For example, if the monitoring result is that the sound-receiving state is the activated state, then the control pin of the embedded controller 15 is set to a low level, so that the indicator light 16 operates in the second state; if the monitoring result is that the sound-receiving state is the disabled state, then the control pin of the embedded controller 15 is set to a high level, so that the indicator light 16 operates in the first state, but it is not limited thereto.

Figure 7:
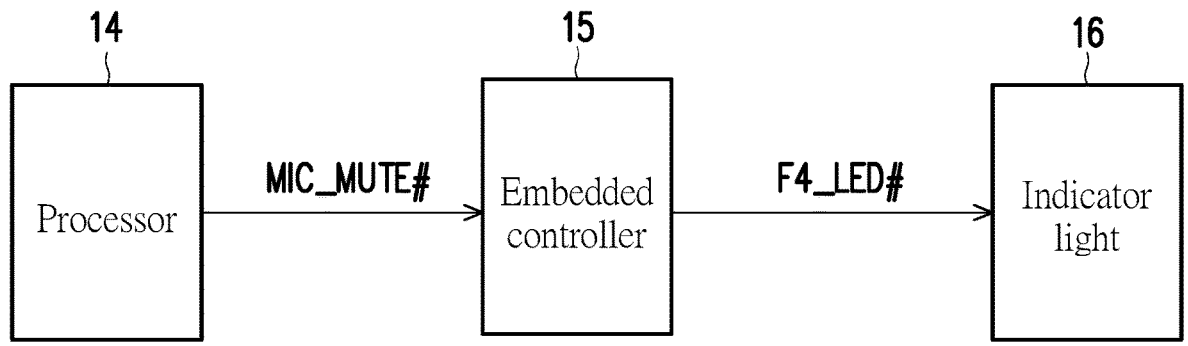
FIG. 7 is a schematic diagram of signal control according to an embodiment of the disclosure.

For a hardware design, FIG. 7 is a schematic diagram of signal control according to an embodiment of the disclosure. With reference to FIG. 7, the processor 14 directly transmits a state control signal (for example, a command MIC_MUTE#for setting the microphone 11 to the disabled state). The embedded controller 15 may set the corresponding pin F4_LED#of the indicator light 16 according to the state control signal.

Figure 8:
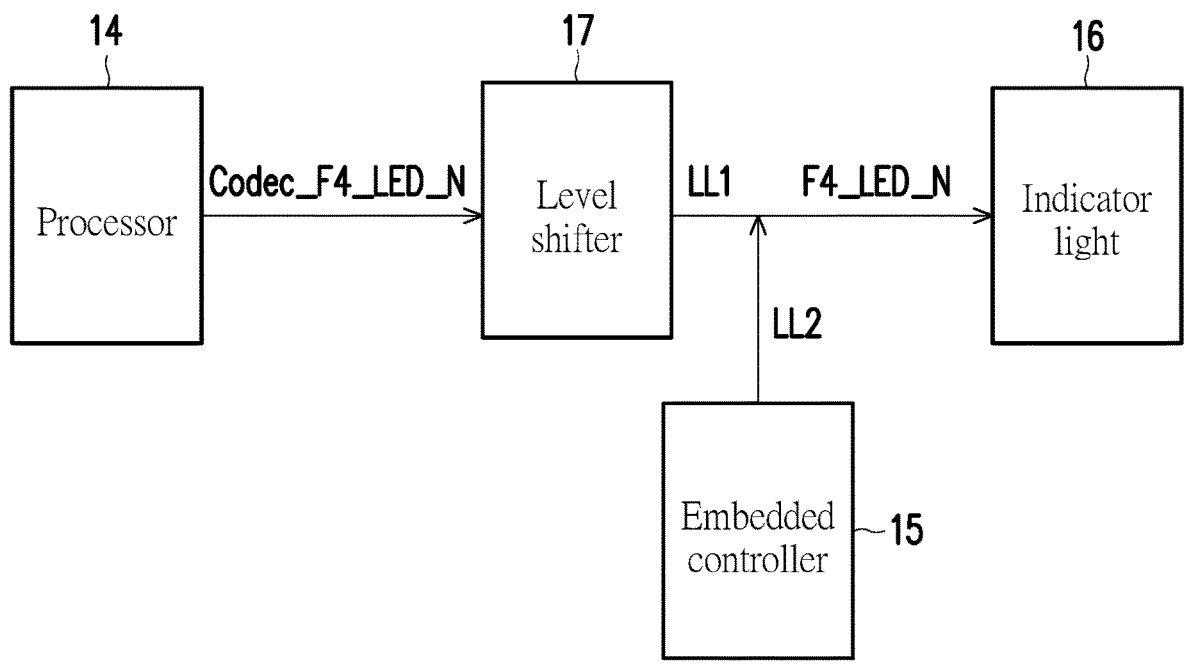
FIG. 8 is a schematic diagram of signal control according to another embodiment of the disclosure.

FIG. 8 is a schematic diagram of signal control according to another embodiment of the disclosure. With reference to FIG. 8, the electronic apparatus 10 further includes a level shifter 17. The level shifter is coupled to the processor 14, the indicator light 16 and the embedded controller 15. The level shifter is configured to convert the state control signal from the processor 14 (for example, a command codec F4_LED_N for setting the microphone 11 to the disabled state) into a first level LL1. For example, the disabled state is a low level, and the activated state is a high level. The indicator light 16 may exhibit a corresponding state F4_LED_N according to the first level and the second level LL2 of the control pin provided by the embedded controller 15. For example, table (1) is the corresponding relationship between the indicator light 16, the first level and the second level:

TABLE 1

| | Power saving state | Power saving state | Working state | Working state |
|---|---|---|---|---|
| First level | 1 | 0 | 1 | 0 |
| Second level | 0 | 0 | 1 | 1 |
| Indicator light | 0 | 0 | 1 | 0 |

For the first level and the second level, "0" represents the low level, and "1" represents the high level. For the indicator light, "0" represents the second state (for example, light off), and "1" represents the first state (for example, light on). It may be seen that when the second level is "0," no matter what the value of the first level is, the indicator light 16 is in the second state. When the second level is "1," if the first level is "0," the indicator light 16 is in the second state, and if the first level is "1," the indicator light 16 is in the first state.

Embodiments of the disclosure may also control the indicator light 16 for a power saving state. The power saving state is, for example, a sleep state or a standby state. In an embodiment, in response to the power saving state of the electronic apparatus 10, the processor 14 may set the indicator light 16 to the second state (for example, light off or other low power consumption states) through the embedded controller 15.

Figure 9:
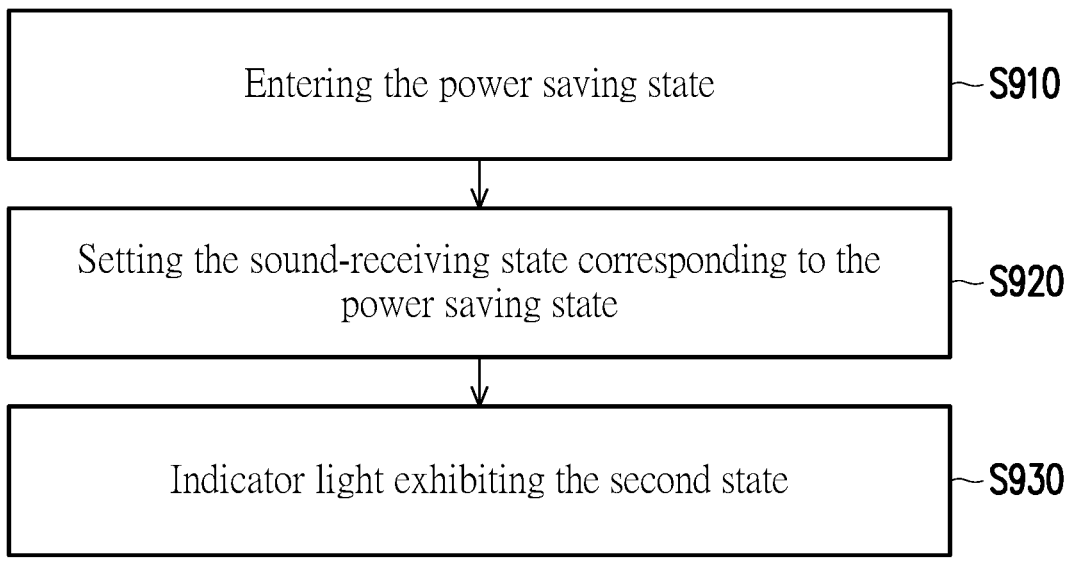
FIG. 9 is a flowchart of light control in a power saving state according to an embodiment of the disclosure.

For example, FIG. 9 is a flowchart of light control in a power saving state according to an embodiment of the disclosure. With reference to FIG. 9, the electronic apparatus 10 enters the power saving state (for example, a modern standby mode) (step S910). The processor 14 sets the sound-receiving state corresponding to the power saving state (step S920), that is, the second state corresponding to the disabled state. Taking FIG. 8 and Table (1) as an example, the processor 14 sets the second level LL2 of the control pin provided by the embedded controller 15 to a low level. Therefore, the indicator light 16 may exhibit the second state (step S930).

In an embodiment, in response to the electronic apparatus 10 changing from the power saving state to the working state, the processor 14 may set the indicator light 16 to a state corresponding to the sound-receiving state of the microphone 11 through the embedded controller 15. That is, if the sound-receiving state of the microphone 11 before entering the power saving state is the activated state, the indicator light 16 is switched back to the first state corresponding to the activated state. However, if the sound-receiving state of the microphone 11 before entering the power saving state is the disabled state, the indicator light 16 maintains the first state corresponding to the disabled state.

Figure 10:
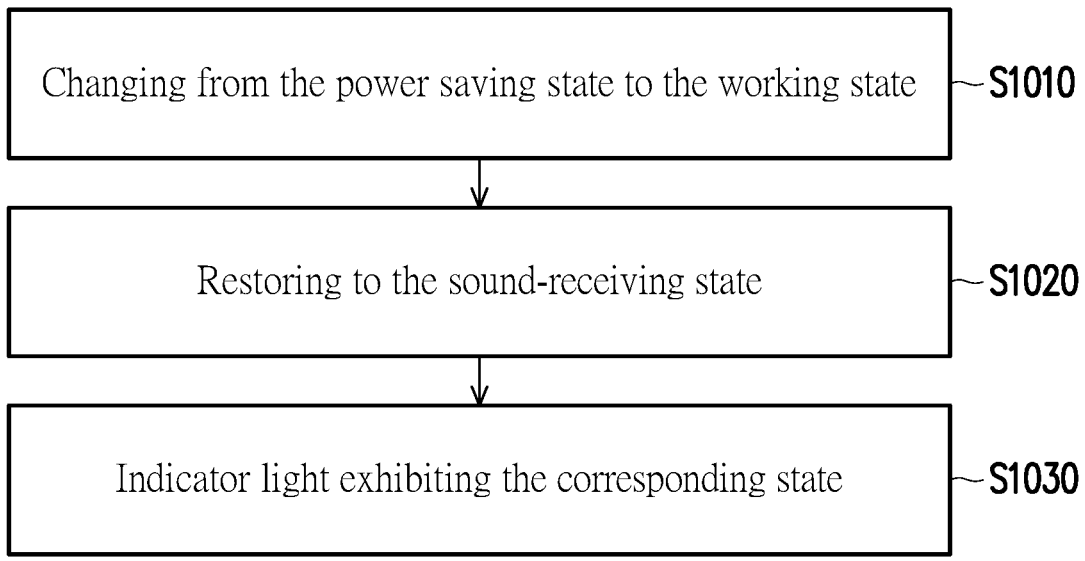
FIG. 10 is a flowchart of light control in a working state according to an embodiment of the disclosure.

For example, FIG. 10 is a flowchart of light control in a working state according to an embodiment of the disclosure. With reference to FIG. 10, the electronic apparatus 10 changes from the power saving state to the working state (step S1010). The processor 14 restores to the state corresponding to the sound-receiving state (step S1020), and makes the indicator light 16 exhibit the corresponding state (step S1030). For example, the indicator light 16 switches from light off to light on.

To sum up, in the control method of the microphone and the electronic apparatus according to the embodiments of the disclosure, the sound-receiving state of the application may be individually controlled, and the sound-receiving state of some or all applications may be selectively controlled according to different operations. In addition, an indicator light corresponding to the sound-receiving state is provided, and the indicator light may provide a corresponding state in a power saving state. In this way, the mute function of the microphone may be flexibly controlled, thereby enhancing the user experience.

Although the disclosure has been described above with the embodiments, the embodiments are not intended to limit the disclosure. One with ordinary skill in the art may make some changes and modifications without departing from the spirit and scope of the disclosure. Therefore, the protection scope of the disclosure shall be determined by the scope of the appended claims and the equivalents thereof.

What is claimed is:

1. A control method of a microphone, comprising:
   receiving a switching operation, wherein the switching operation is configured to switch a sound-receiving state of a microphone, and the sound-receiving state represents whether to receive sound through the microphone, and the sound-receiving state comprises an activated state and a disabled state;
   in response to receiving the switching operation, detecting the sound-receiving state of a target program, wherein the target program is a currently running application; and
   switching the sound-receiving state of the microphone through an audio effect processing corresponding to the target program according to a detection result of the sound-receiving state, to switch the sound-receiving state of the target program from one of the activated state and the disabled state to the other, wherein the audio effect processing is implemented by an audio engine between an application layer and a driver layer.

2. The control method of the microphone according to claim 1, wherein switching the sound-receiving state comprises:
   keeping unchanged a sound-receiving state of the microphone used for an audio effect processing corresponding to a non-target program, wherein the non-target program is an application currently running but different from the target program.

3. The control method of the microphone according to claim 1, wherein switching the sound-receiving state comprises:
   setting a sound-receiving state of the microphone used for an audio effect processing corresponding to a non-target program to be same as a sound-receiving state to which the target program is switched, wherein the non-target program is an application currently running but different from the target program.

4. The control method of the microphone according to claim 2, further comprising:
   detecting an operation time of the switching operation, wherein the operation time is a pressing time of a key; and
   switching or maintaining the sound-receiving state of the non-target program according to the operation time.

5. The control method of the microphone according to claim 3, further comprising:
   detecting an operation time of the switching operation, wherein the operation time is a pressing time of a key; and
   switching or maintaining the sound-receiving state of the non-target program according to the operation time.

6. The control method of the microphone according to claim 2, wherein the target program and the non-target program share the audio effect processing, and the control method further comprises:
   in the audio engine, providing a virtual audio cable in series between the target program and the audio effect processing; and
   switching only the sound-receiving state of the target program through the virtual audio cable.

7. An electronic apparatus, comprising:
   a microphone configured to receive sound;
   a memory configured to store a code; and
   a processor coupled to the microphone and the memory and configured to load the code to execute:
      receiving a switching operation, wherein the switching operation is configured to switch a sound-receiving state of a microphone, and the sound-receiving state represents whether to receive sound through the microphone, and the sound-receiving state comprises an activated state and a disabled state;
      in response to receiving the switching operation, detecting the sound-receiving state of a target program, wherein the target program is a currently running application; and
      switching the sound-receiving state of the microphone through an audio effect processing corresponding to the target program according to a detection result of the sound-receiving state, to switch the sound-receiving state of the target program from one of the activated state and the disabled state to the other, wherein the audio effect processing is implemented by an audio engine between an application layer and a driver layer.

8. The electronic apparatus according to claim 7, wherein the processor is further configured to execute:
   keeping unchanged a sound-receiving state of the microphone used for an audio effect processing corresponding to a non-target program, wherein the non-target program is an application currently running but different from the target program.

9. The electronic apparatus according to claim 7, wherein the processor is further configured to execute:
   setting a sound-receiving state of the microphone used for an audio effect processing corresponding to a non-target program to be same as a sound-receiving state to which the target program is switched, wherein the non-target program is an application currently running but different from the target program.

10. The electronic apparatus according to claim 8, wherein the processor is further configured to execute:
    detecting an operation time of the switching operation, wherein the operation time is a pressing time of a key; and
    switching or maintaining the sound-receiving state of the non-target program according to the operation time.

11. The electronic apparatus according to claim 9, wherein the processor is further configured to execute:
    detecting an operation time of the switching operation, wherein the operation time is a pressing time of a key; and
    switching or maintaining the sound-receiving state of the non-target program according to the operation time.

12. The electronic apparatus according to claim 8, wherein the target program and the non-target program share the audio effect processing, and the processor is further configured to execute:

in the audio engine, providing a virtual audio cable in series between the target program and the audio effect processing; and switching only the sound-receiving state of the target program through the virtual audio cable.

13. An electronic apparatus, comprising:
a microphone configured to receive sound;
a key configured to receive a switching operation, wherein the switching operation is configured to switch a sound-receiving state of a microphone, and the sound-receiving state represents whether to receive sound through the microphone, and the sound-receiving state comprises an activated state and a disabled state;
an indicator light configured to indicate the sound-receiving state, provide a first state for indicating the activated state, and provide a second state for indicating the disabled state;
an embedded controller coupled to the indicator light and configured to control the indicator light;
a memory configured to store a code; and
a processor coupled to the microphone, the key, the embedded controller and the memory and configured to load the code to execute:
  switching the indicator light from one of the first state and the second state to the other through the embedded controller according to a sound-receiving state of a target program and a reception of the switching operation, and the processor is further configured to execute:
    detecting, through the key, the reception of the switching operation;
    in response to the reception of the switching operation, determining whether a buffer in an audio effect corresponding to the target program is null, to generate a detection result of the sound-receiving state of the target program, wherein the target program is a currently used program; and
    switching the sound-receiving state of the microphone through an audio effect processing corresponding to the target program according to the detection result of the sound-receiving state, to switch the sound-receiving state of the target program from one of the activated state and the disabled state to the other, and determining the indicator light is in the first state or the second state according to the detection result of the sound-receiving state of the target program, wherein the audio effect processing is implemented by an audio engine between an application layer and a driver layer, the audio engine provide a software-based digital signal processing effect for an audio stream by an audio processing object, and the audio stream is stopped input from the microphone to the target program through a virtual audio cable for the disabled state, wherein the virtual audio cable is connected between the target program and the audio effect corresponding to the target program.

14. The electronic apparatus according to claim 13, wherein the processor is further configured to execute:
  receiving a scan code from the key through an audio service; and
  setting a corresponding sound-receiving state of the microphone and setting a control pin of the embedded controller according to the scan code through an audio driver.

15. The electronic apparatus according to claim 13, wherein the processor is further configured to execute:
  in response to a power saving state of the electronic apparatus, setting the indicator light to the second state through the embedded controller; and
  in response to the electronic apparatus changing from the power saving state to a working state, setting the indicator light to a state corresponding to the sound-receiving state of the microphone through the embedded controller.

16. The electronic apparatus according to claim 13, further comprising:
  a level shifter coupled to the processor, the indicator light and the embedded controller, and configured to convert a state control signal from the processor into a first level, wherein the indicator light exhibits a corresponding state according to the first level and a second level of the embedded controller.

* * * * *